(12) United States Patent
Belmonte et al.

(10) Patent No.: US 9,039,351 B2
(45) Date of Patent: May 26, 2015

(54) ANNULAR FLANGE FOR FASTENING A ROTOR OR STATOR ELEMENT

(75) Inventors: Olivier Belmonte, Perthes en Gatinais (FR); Gregory Nicolas Gerald Gillant, Mennecy (FR)

(73) Assignee: SNECMA, Paris (FR)

( * ) Notice: Subject to any disclaimer, the term of this patent is extended or adjusted under 35 U.S.C. 154(b) by 712 days.

(21) Appl. No.: 12/994,972

(22) PCT Filed: Apr. 27, 2009

(86) PCT No.: PCT/FR2009/000491
§ 371 (c)(1),
(2), (4) Date: Nov. 29, 2010

(87) PCT Pub. No.: WO2009/144409
PCT Pub. Date: Dec. 3, 2009

(65) Prior Publication Data
US 2011/0097206 A1 Apr. 28, 2011

(30) Foreign Application Priority Data
May 29, 2008 (FR) ...................... 08 02918

(51) Int. Cl.
*F01D 5/06* (2006.01)
*F01D 5/02* (2006.01)
*F01D 25/24* (2006.01)

(52) U.S. Cl.
CPC *F01D 5/026* (2013.01); *F01D 5/06* (2013.01); *F01D 25/243* (2013.01); *Y02T 50/671* (2013.01)

(58) Field of Classification Search
CPC .................................................. F01D 25/243
USPC ............... 415/174.5, 119.5, 209.2, 209.3; 416/198 A
See application file for complete search history.

(56) References Cited

U.S. PATENT DOCUMENTS

| 3,939,651 | A | * | 2/1976 | Penny ............................ 60/799 |
| 6,893,222 | B2 | * | 5/2005 | Allam ........................... 416/144 |
| 2004/0156708 | A1 | | 8/2004 | Allam |
| 2005/0025625 | A1 | | 2/2005 | Escure et al. |
| 2007/0059164 | A1 | * | 3/2007 | Brault et al. ............... 415/174.5 |

FOREIGN PATENT DOCUMENTS

DE 35 32 929 A1 3/1987
EP 1 445 422 A2 8/2004
(Continued)

OTHER PUBLICATIONS

U.S. Appl. No. 13/127,836, filed May 5, 2011, Belmonte, et al.
(Continued)

*Primary Examiner* — Nathaniel Wiehe
*Assistant Examiner* — Brian O Peters
(74) *Attorney, Agent, or Firm* — Oblon, McClelland, Maier & Neustadt, L.L.P.

(57) ABSTRACT

A radial annular flange of a rotor or stator element of a turbomachine including, at an inner/outer periphery, alternating solid portions and hollow portions, the solid portions including orifices for passing fastener bolts. The flange in the bottom of at least one hollow portion has a radius relative to the axis of the turbomachine that is less/greater than the radius of a circle that is tangential to the outsides/insides of the orifices for passing bolts through the solid portions.

8 Claims, 3 Drawing Sheets

(56) References Cited

FOREIGN PATENT DOCUMENTS

| EP | 1 496 266 A1 | 1/2005 |
| EP | 1 717 415 A1 | 11/2006 |

OTHER PUBLICATIONS

International Search Report issued Oct. 7, 2009, in International Patent Application No. PCT/FR2009/000491.

* cited by examiner

ANNULAR FLANGE FOR FASTENING A
ROTOR OR STATOR ELEMENT

BACKGROUND OF THE INVENTION

1. Field of the Invention

The invention relates to annular flanges for fastening rotor or stator elements together, and to a turbomachine including an assembly of such flanges.

2. Description of the Related Art

In a turbomachine, the rotor disks (e.g. of the turbine) are connected together by annular flanges at their radially inner peripheries, these flanges being pressed against one another and fastened together by bolts.

Other elements, such as supports for annular tracks of abradable material, may also have annular flanges at their inner peripheries, which flanges are clamped between two annular flanges of rotor disks and are fastened using the same bolts as are used for the rotor disks.

These annular flanges are generally festooned, i.e. they comprise alternating solid portions and hollow portions so as to reduce their weight. Holes for fastening fastener bolts are formed through the solid portions.

In order to assemble together a plurality of stacked-together flanges, it is necessary for the through holes formed in the solid portions of the flanges to be in alignment so as to ensure that none of the flanges has its hollow portions offset angularly so as to be in alignment with the through holes for the bolts formed through the solid portions of the other flanges, since under such circumstances that flange would no longer be fastened to the other flanges by means of bolts, but solely by being clamped between two other flanges, and in operation it might escape, with severe consequences.

BRIEF SUMMARY OF THE INVENTION

A particular object of the invention is to avoid those drawbacks in a manner that is simple, effective, and inexpensive.

To this end, the invention provides a radial annular flange of a rotor element or a stator element having, on an inner or outer periphery, alternating solid portions and hollow portions, the solid portions including orifices for passing fastener bolts, the flange being characterized in that it includes angular mistake-proofing means constituted by the bottom of at least one hollow portion of the inner/outer periphery having a radius relative to the axis of the turbomachine that is less/greater than the radius of a circle tangential to the outsides/insides of the orifices for passing bolts through the solid portions, so as to oppose passing a fastener bolt through said solid portion and thus ensure that the flange is fastened to another flange in a correct angular position.

According to the invention, when a flange is angularly offset in such a manner that its orifices are no longer in alignment with the orifices in the other flanges, the mistake-proofing means ensure that the bottom of at least one of the hollow portions in said flange lies on the path of at least one fastener bolt, and prevents it from being inserted through the orifices in the other flanges, thereby avoiding any risk of the flange being incorrectly mounted.

According to another feature of the invention, the said bottom of smaller/greater radius extends over the entire interval between two solid portions.

In order to limit the increase in weight caused by modifying the radius of at least one hollow portion of the flange, it suffices for the bottom radius of at least one hollow portion to lie between the radius of a circle that is tangential to the insides of the orifices of the solid portions and the radius of a circle that is tangential to the outsides of the orifices of the solid portions.

Advantageously, the radius of the bottom of at least one hollow portion is about 10% less/greater than the radius of the circle that is tangential to the outsides/insides of the orifices of the solid portions.

In a particular embodiment of the invention, the flange has only one bottom of a hollow portion with its radius determined as described above, and the unbalance created by said hollow portion bottom is compensated by machining a rotary balancing bead that is formed on the flange.

In a variant of the invention, the flange has a plurality of hollow portion bottoms of radius determined as described above, these bottoms being regularly distributed around the inner or outer circumference of the flange, thereby generating no rotary unbalance and not requiring the use of a balancing bead.

The invention also provides an assembly of rotor or stator elements of a turbomachine, characterized in that it includes at least one annular flange of the above-described type that is fastened to other annular flanges by bolts that extend through orifices in the other annular flanges and through orifices in the solid portions of said annular flange, said bottom of smaller/greater radius extending between two solid portions of said annular flange and between two solid portions of at least one of the other annular flanges.

The invention also provides a turbomachine such as a turbojet or turboprop that is characterized in that it includes an assembly of rotor or stator elements as described above.

BRIEF DESCRIPTION OF THE SEVERAL
VIEWS OF THE DRAWINGS

The invention can be better understood and other details, advantages, and characteristics of the invention appear on reading the following description made by way of non-limiting example and with reference to the accompanying drawings, in which.

DETAILED DESCRIPTION OF THE INVENTION

Figure 1:
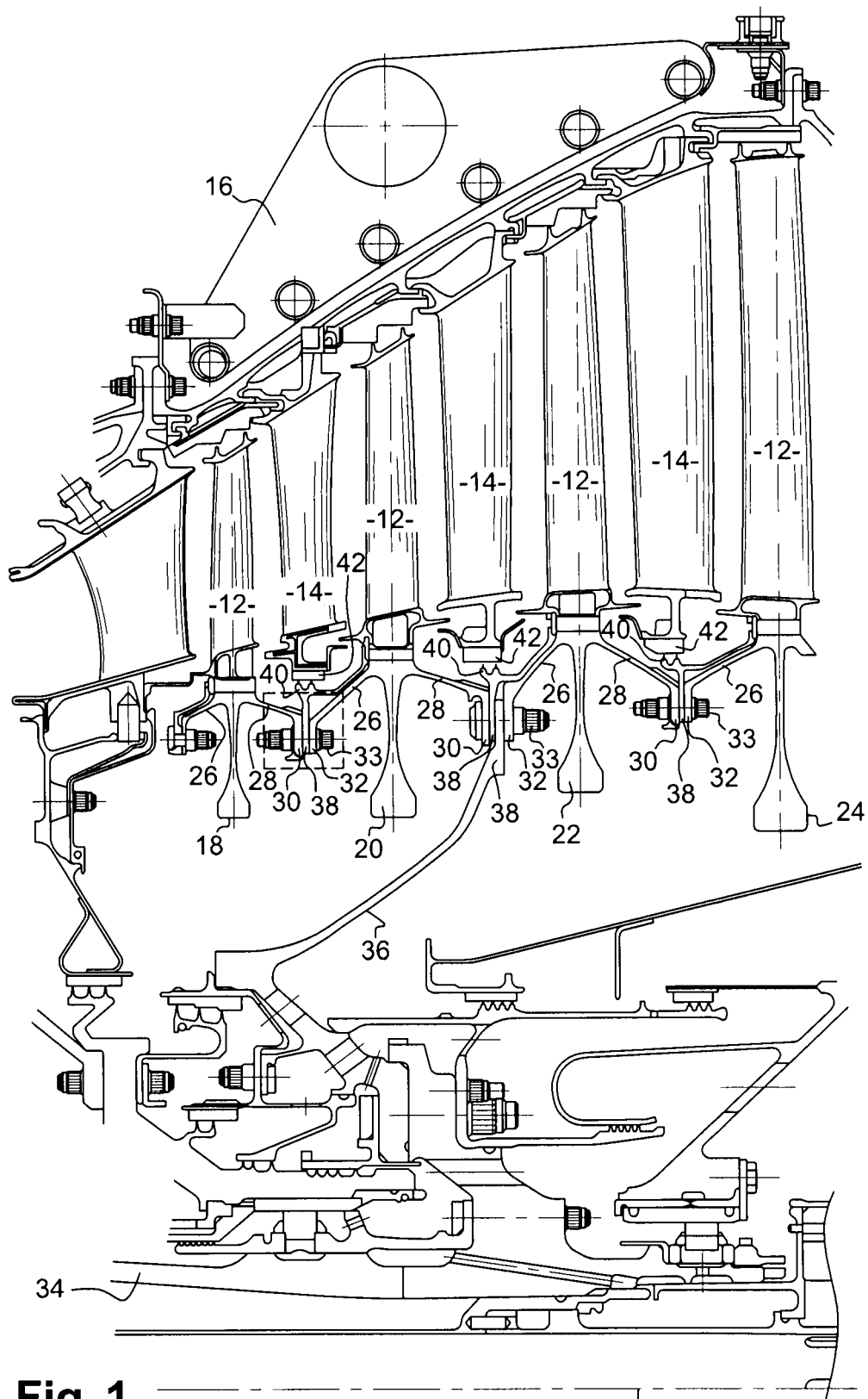
FIG. 1 is a fragmentary diagrammatic half-section view in axial section of a low pressure turbine.

Reference is made initially to FIG. 1, which shows a low-pressure turbine rotor of axis 10 comprising alternating rotor blades 12 and stator vanes 14 housed in an outer casing 16. The radially inner ends of the rotor blades 12 are fastened to the outer peripheries of rotor disks 18, 20, 22, 24. Each disk 18, 20, 22, 24 has upstream and downstream frustoconical walls 26 and 28 at its outer periphery for connection with other disks by means of annular flanges 30, 32 extending radially inwards and fastened to one another by bolts 33. The set of disks is connected to a turbine shaft 34 via a drive cone 36 having an annular flange 38 clamped between the annular flanges 30, 32 of the disks 20 and 22.

In order to avoid unwanted air flow between the inner periphery of a row of stator vanes 14 and the downstream and upstream frustoconical walls 28 and 26 of the disks, a radial annular flange 38 carrying a labyrinth seal 40 at its outer periphery is interposed between the radial flanges 30, 32 of the downstream and upstream frustoconical walls 28 and 26 of the disks, the labyrinth seal 40 co-operating with a track 42 of abradable material mounted on the inner periphery of a row of stator vanes 14.

Figure 2:
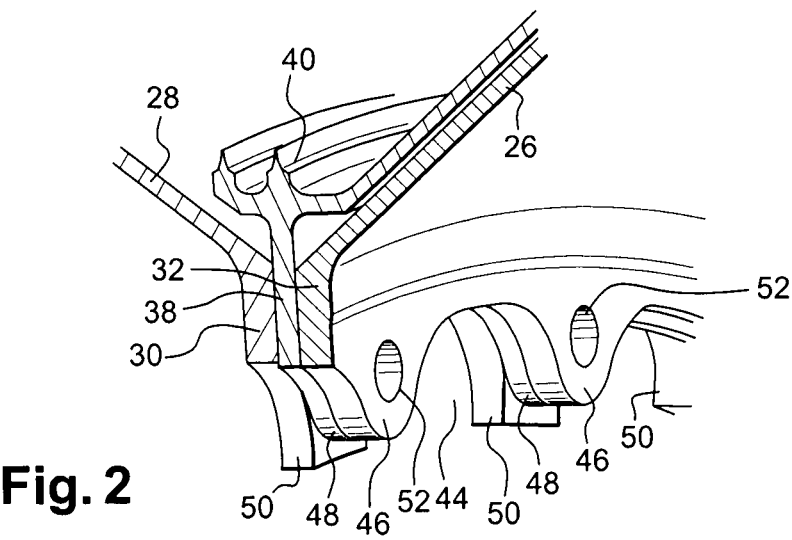
FIG. 2 is an enlarged diagrammatic view in perspective of the zone defined by dashed lines in FIG. 1, and in which an annular flange is correctly fastened between two other annular flanges.

As shown in FIG. 2, the radial annular flange 30, 32 of the upstream and downstream frustoconical walls 26 and 28, and the radial flange 38 of a labyrinth seal 40 are festooned and comprise alternating hollow portions 44 and solid portions 46, 48, and 50, respectively, the solid portions 46, 48, 50 including orifices 52 for receiving fastener bolts enabling the annular flanges of the upstream and downstream frustoconical walls 26 and 28 to be secured together with the annular flange 38 of the labyrinth seal 40.

Figure 3:
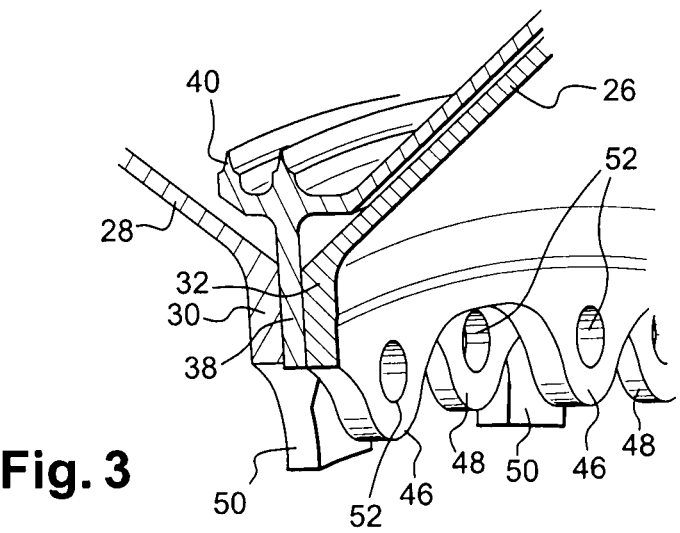
FIG. 3 is a diagrammatic view in perspective identical to FIG. 2 in which an annular flange is angularly offset between two other annular flanges.

Nevertheless, when the annular flange 38 of the labyrinth seal 40 is put into place between the annular flanges of the upstream and downstream frustoconical walls 26 and 28, it is possible for there to be an angular offset of the annular flange 38, leading to the solid portions 46, 50 of the annular flanges 30, 32 of the upstream and downstream frustoconical walls 26 and 28 being in axial alignment, while the solid portions 48 of the annular flange 38 of the labyrinth seal 40 are axially aligned with the hollow portions 44 of the annular flanges 30, 32 of the upstream and downstream frustoconical walls 26 and 28 (FIG. 3). Such positioning leads to the fastener bolts that are inserted in the orifices 52 of the flanges 30, 32 of the upstream and downstream frustoconical walls 26, 28 not being inserted through the orifices 52 in the flange 38 of the labyrinth seal 40. Thus, the flange 38 of the labyrinth seal 40 is held in position only by being clamped between the flanges 30, 32 of the frustoconical walls 26, 28, and it is not held by the fastener bolts.

According to the invention, these drawbacks as mentioned above are avoided, as shown in FIG. 4, by the fact that the flange has angular mistake-proofing means for use in assembling it with the other flanges, these mistake-proofing means being constituted by the bottom 54 of at least one hollow portion 44 of the flange 38 of the labyrinth seal 40 having a radius relative to the turbomachine axis 10 that is less than the radius of a circle 56 that is tangential to the outsides of the orifices 52 in the solid portions 48.

Figure 5:
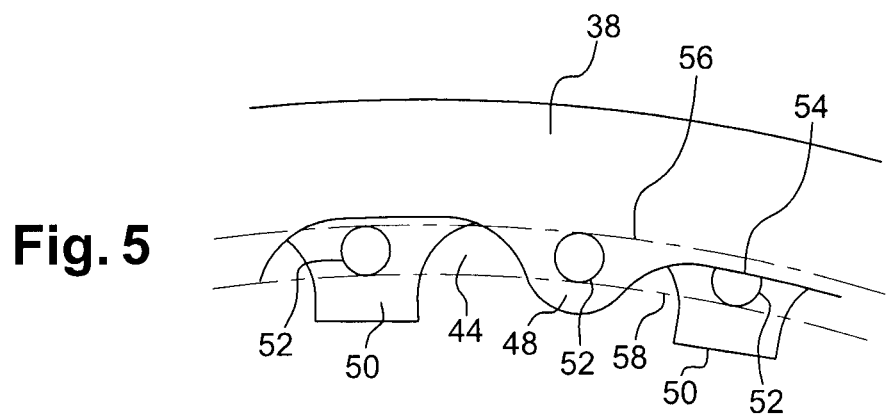
FIG. 5 is a fragmentary diagrammatic face view of a radial annular flange of the invention, showing incorrect angular positioning.

During assembly of the flange 38 of the labyrinth seal 40 between the annular flanges 30, 32 with an angular offset such that the hollow portions 44 are in axial alignment with the solid portions 46, 50 of the flanges 30, 32, inserting fastener bolts into the orifices 52 in the solid portions 46, 50 of the flanges 30, 32 of the upstream and downstream frustoconical walls 26 and 28 is made impossible since the bottom 54 of at least one hollow portion 44 is situated on the path of a bolt (FIG. 5). Thus, a single hollow portion 44 of radius as determined by the invention suffices to guarantee correct assembly.

Figure 4:
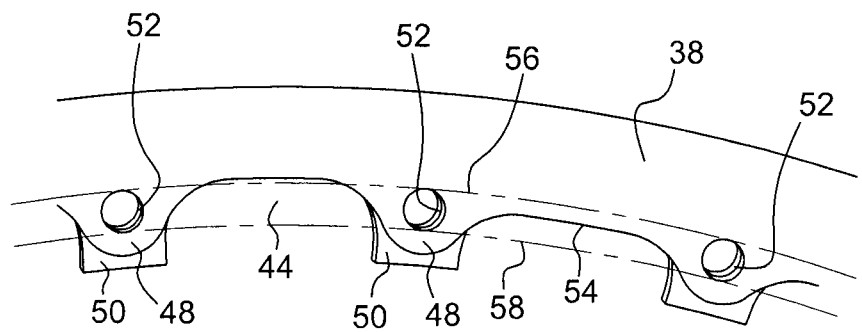
FIG. 4 is a fragmentary diagrammatic face view of a radial annular flange of the invention, showing correct angular positioning.

Preferably, the radius of the bottom of at least one hollow portion 44 lies between the radius of the circle 56 that is tangential to the outsides of the orifices 52 in the solid portions 48 and the radius of a circle 58 that is tangential to the insides of the same orifices (FIG. 4). It suffices that the bottom of at least one hollow portion 44 lies between these two circles to prevent incorrect assembly of the radial flange 38 of the labyrinth seal 40.

In a preferred embodiment of the invention, the radius of the bottom of at least one hollow portion 44 is about 10% less than the radius of the circle that is tangential to the outsides of the orifices of the solid portions, which suffices to compensate for the effects of flange manufacturing tolerances and of the orifices being positioned in register with the solid portions of the flange, thus always ensuring that angular mistake-proofing is achieved.

Figure 6:
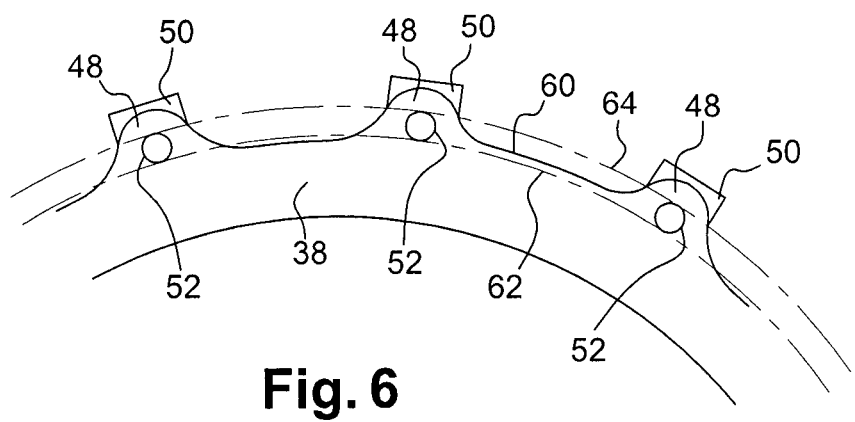
FIG. 6 is a diagrammatic fragmentary face view of another embodiment of a radial annular flange of the invention.

In a variant of the invention shown in FIG. 6, the festoons of the flanges are formed at their outer peripheries. Under such circumstances, the bottom 60 of at least one hollow portion 44 of a flange has a radius that is greater than the radius of the circle 62 that is tangential to the insides of the orifices 52 for passing bolts through the solid portions 48.

In a manner similar to when the festoons are formed at the inside periphery of the flange 38, it is preferable for the radius of the bottom 60 of at least one hollow portion 44 to lie between the radius of the circle 62 that is tangential to the insides of the orifices 52 of the solid portions 48 and the radius of a circle 64 that is tangential to the outsides of the same orifices (FIG. 6).

Advantageously, the radius of the bottom 60 of at least one hollow portion 44 is about 10% greater than the radius of the circle 62 tangential to the insides of the orifices 52 of the solid portions 48.

In the embodiment where the annular flange 38 has only one bottom 54, 60 of a hollow portion 44 with a radius determined as described above, a balancing bead is made around the flange 38 so as to enable the unbalance created in rotation by the sole bottom 54, 60 of a hollow portion 44 to be compensated by machining.

The annular flange 38 may have a plurality of hollow portions 44 having a radius as determined above and distributed angularly around the inner or outer periphery of the flange depending on whether the festoons are situated radially on the inside or on the outside of the flange. Under such circumstances, there is no need to provide a balancing bead, since a regular distribution of the bottoms 54, 60 of the hollow portions 44 having a radius as defined by the invention does not generate unbalance.

The invention may also apply to assemblies of more than three flanges. More generally, in order to guarantee correct assembly of n rotor or stator elements, it suffices that n−1 of these elements each has a radial flange with at least one bottom 54, 60 of a hollow portion having its radius determined as described above. It is simple to make a bottom 54, 60 for a hollow portion 44 of radius as described above, since it suffices to reduce the depth to which a hollow portion 44 is machined in the flange 38. Furthermore, the bottoms 54, 60 may serve as an angular index mark for positioning the flange.

The invention is applicable whenever festooned annular flanges are fastened together by bolts, in particular in a turbomachine.

The invention claimed is:

1. A first radial annular flange for an assembly of rotor elements or stator elements comprising:
   on an inner or outer periphery of the first flange having alternating solid portions and hollow portions, the solid portions including orifices for passing fastener bolts for fastening the first flange with a second flange; and
   angular mistake-proofing means constituted by the bottom of only one single hollow portion of the inner or outer periphery having a radius relative to an axis of the turbomachine that is less than or greater than a radius of a circle tangential to the outsides or insides of the orifices for passing bolts through the solid portions, so as to oppose passing a fastener bolt through the solid portion and thus ensure that the first flange is fastened to the second flange in a correct angular position.

2. The first flange according to claim 1, wherein the bottom of the only one single hollow portion having the smaller or greater radius extends over an entire interval between two solid portions.

3. The first flange according to claim 1, wherein the radius of the bottom of the only one single hollow portion lies between the radius of a circle that is tangential to the insides of the orifices in the solid portions and the radius of a circle that is tangential to the outsides of the orifices in the solid portions.

4. The first flange according to claim 1, wherein the radius of the bottom of the only one single hollow portion is about 10% less or greater than the radius of the circle that is tangential to the outsides or insides of the orifices of the solid portions.

5. The first flange according to claim 1, comprising a plurality of bottoms of hollow portions with the radius, the bottoms being regularly distributed around the inner or outer circumference of the first flange.

6. An assembly of rotor elements or stator elements of a turbomachine, comprising:
    a first annular flange according to claim 1 that is fastened to a second annular flange by bolts that extend through orifices in the second annular flange and through orifices in the solid portions of the first annular flange,
    wherein the bottom of the only one single hollow portion having the smaller or greater radius extends between two solid portions of the first annular flange and between two solid portions of the second annular flange.

7. A turbomachine, a turbojet, or a turboprop, comprising the assembly according to claim 6.

8. The first flange according to claim 1, wherein the bottom of the only one single hollow portion includes a flat portion.

\* \* \* \* \*